Figure 1:
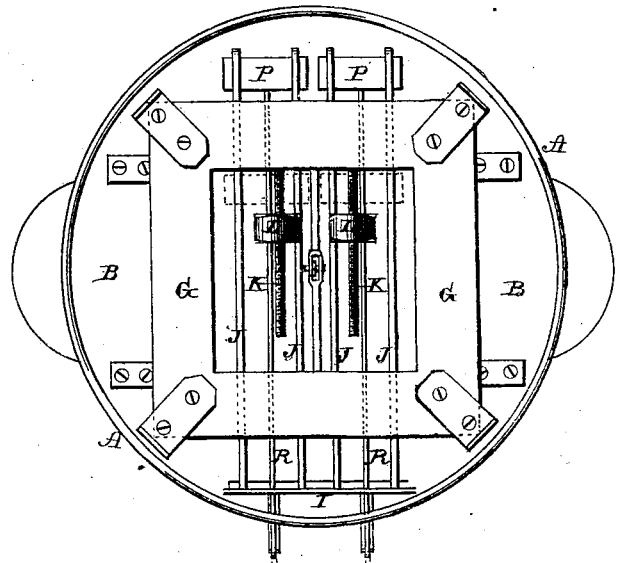
Figure 2:
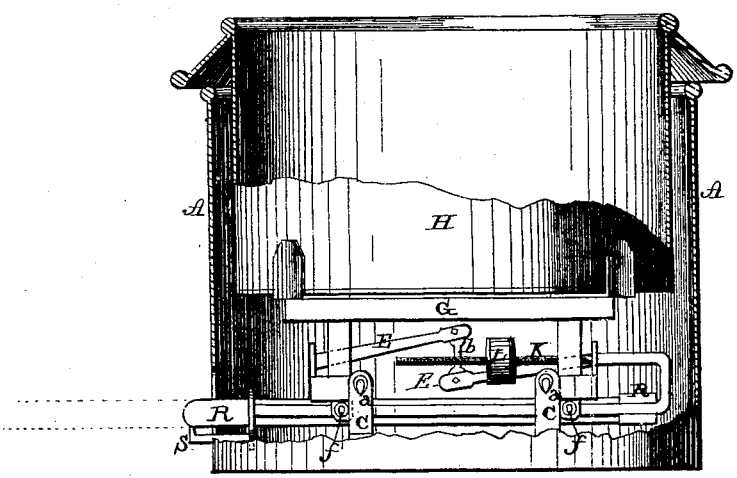
Figure 3:
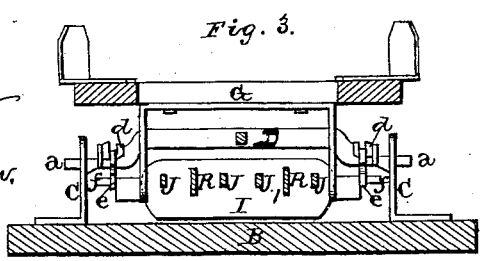

L. W. CROSS.
WEIGHING SCALES.

No. 185,731.  Patented Dec. 26, 1876.

WITNESSES:  INVENTOR:

UNITED STATES PATENT OFFICE.

LAROY W. CROSS, OF ANGOLA, INDIANA.

IMPROVEMENT IN WEIGHING-SCALES.

Specification forming part of Letters Patent No. 185,731, dated December 26, 1876; application filed July 11, 1876.

*To all whom it may concern:*

Be it known that I, LAROY W. CROSS, of Angola, in the county of Steuben and State of Indiana, have invented certain new and useful Improvements in Measuring-Scales; and I do hereby declare the following to be a full, clear, and exact description of the invention, such as will enable others skilled in the art to which it pertains to make and use it, reference being had to the accompanying drawings, which form part of this specification.

The nature of my invention consists in the construction and arrangement of a measuring-scale, as will be hereinafter more fully set forth.

In the annexed drawing, which forms a part of this specification, and which fully illustrates my invention, A represents the exterior case, which may be made round, or of any suitable shape and dimensions. On the bottom B of this case are four posts, C C, which have suitable apertures in their upper ends, to receive the knife-edge projections *a a* of two arched angular beams, D D, as shown. From the beams D D extend two levers, E E, inward toward each other, and the inner ends of said levers connected by a link, *b*. At each end of each beam D is a hook projection, *d*, on which is suspended a link, *e*, and in these four links are placed four knife-edge projections, *f*, extending from a platform or frame, G, that supports the measure H.

J J represent four levers, which are attached to a plate, I, and pass from said plate longitudinally through the case A, under the beams D D; and at the other side said levers are bent upward and forward, and attached to the beam D on that side of the scale. From this beam D also project two screw-rods, K K, upon which are adjustable balls L L, for balancing the scale. On each two of the levers J J is a sliding poise or weight, P, attached to a graduated bar, R, which passes through a slot in the side of the case A, near where the plate I is situated, the graduated bars passing first through said plate. Any number of these sliding weights and graduated draw-bars may be used, and the measure H may be of any size desired.

By having two or more draw-bars to pull out, one may be made to act as a tare-beam by letting it remain at the point where it balances the tare, and using the others to give the weight.

There is a bent bar or pointer, S, for each draw-bar R, attached to the plate I, and projecting through the slots in the case A, upon which said draw-bars rest, as shown.

This invention may be applied to any weighing-scales for weighing any articles desired.

Having thus fully described my invention, what I claim as new, and desire to secure by Letters Patent, is—

The combination of the platform G, beams D D, with connected levers E E, the beams J, plate I, screw-rods K, with balls L, the sliding weights P, with draw-bars R, and the pointers S, all constructed and arranged substantially as and for the purposes herein set forth.

In testimony that I claim the foregoing I have hereunto set my hand this 4th day of July, 1876.

LAROY W. CROSS.

Witnesses:
HENRY C. ADAMS,
BENJ. F. DAWSON.